United States Patent [19]

Odate et al.

[11] 4,156,666

[45] May 29, 1979

[54] DEGRADABLE SYNTHETIC RESIN COMPOSITIONS

[75] Inventors: Ryoji Odate, Yokohama; Yuuichi Miyahara, Funabashi, both of Japan

[73] Assignee: Shiseido Company, Ltd., Tokyo, Japan

[21] Appl. No.: 627,818

[22] Filed: Oct. 31, 1975

[51] Int. Cl.² .............................................. C08L 91/00
[52] U.S. Cl. .................................. 260/23 H; 526/5; 260/DIG. 43
[58] Field of Search ................... 260/DIG. 43, 23 H; 526/5

[56] References Cited

U.S. PATENT DOCUMENTS

| | | | |
|---|---|---|---|
| 2,405,933 | 8/1946 | Alderson, Jr. | 260/23 H |
| 3,231,530 | 1/1966 | Prahl | 260/23 H |
| 3,403,117 | 9/1968 | Floyd | 260/23 H |
| 3,444,115 | 5/1969 | Needham et al. | 260/23 H |
| 3,694,403 | 9/1972 | Aishima et al. | 260/23 H |
| 3,797,690 | 3/1974 | Taylor et al. | 260/DIG. 43 |
| 3,803,065 | 4/1974 | Arai et al. | 526/5 |
| 3,847,852 | 11/1974 | White et al. | 260/DIG. 43 |
| 3,852,227 | 12/1974 | Matsuda et al. | 260/23 H |
| 3,907,726 | 9/1975 | Tomiyama | 260/DIG. 43 |

FOREIGN PATENT DOCUMENTS

| | | | |
|---|---|---|---|
| 2109773 | 5/1972 | France | 260/DIG. 43 |
| 43-8605 | 4/1968 | Japan | 526/5 |
| 47-16538 | 5/1972 | Japan | 526/5 |
| 50-52153 | 5/1975 | Japan | 260/DIG. 43 |
| 50-67346 | 6/1975 | Japan. | |
| 50-82152 | 7/1975 | Japan. | |
| 50-11350 | 9/1975 | Japan. | |

*Primary Examiner*—Melvyn I. Marquis
*Attorney, Agent, or Firm*—Sughrue, Rothwell, Mion, Zinn and Macpeak

[57] ABSTRACT

A degradable synthetic resin composition comprising a polyolefin, about 0.2 to 10% by weight of an organic degradation promotor and, optionally, about 10 to 60% by weight of an inorganic filler, and films for use in the agricultural environment prepared therefrom.

2 Claims, 8 Drawing Figures

DEGRADABLE SYNTHETIC RESIN COMPOSITIONS

BACKGROUND OF THE INVENTION

1. Field of the Invention

This invention relates to a photodegradable synthetic resin composition.

2. Description of the Prior Art

The quantity of synthetic resin materials used, primarily polyolefin and polystyrene resin materials, has increased tremendously in recent years because of their low cost, good moldability, stability, and resistance to degradation such as corrosion or putrefaction. Due to the stability of such resins, in recent years synthetic resin waste has begun to pose a problem of soil pollution and to damage incinerators due to the high heat generated during their incineration. Accordingly, methods for disposing of plastic wastes without causing pollution have been extensively investigated.

For example, U.S. Pat. No. 3,795,654 discloses a polyolefin film containing an oxidizing metal and a lower alkyl thiourea; U.S. Pat. No. 3,864,293 discloses a styrene resin composition containing at least one salt of an organic carboxylic acid; U.S. Pat. No. 3,888,804 discloses a composition comprising polystyrene and a photosensitizing agent represented by the formulae:

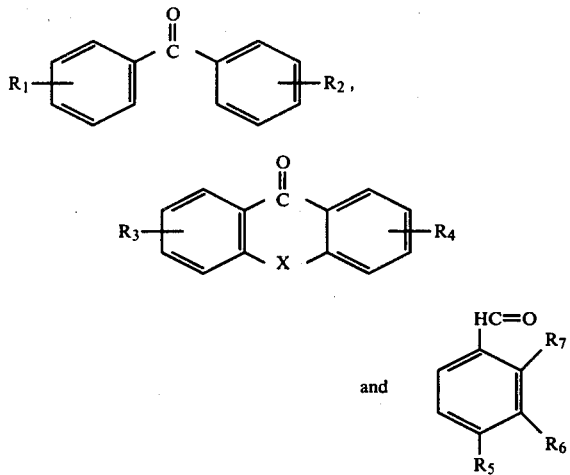

U.S. Pat. No. 3,903,204 discloses a process for making expandable styrene polymer particles containing a photosensitizer selected from the group consisting of xanthene, thioxanthene and their $C_1$–$C_4$ alkyl derivatives.

U.S. Pat. No. 3,454,510 discloses polyolefin compositions containing a pro-oxidant and an opaquing agent, which films are suitable for forming into agricultural mulching films. The prooxidant is (a) acetyl acetonate, an alkyl acetoacetate or an alkyl benzoyl acetate of a metal, or (b) a metal stearate or oleate.

U.S. Pat. No. 3,320,695 discloses a degradable agricultural mulching film consisting of a polyolefin and an additive selected from the group consisting of unhydrogenated polyterpenes, coumarone-indene resins and rosin.

U.S. Pat. No. 3,840,512 discloses polyolefin compositions containing a free carboxylic acid and a metal salt of a carboxylic acid.

British Pat. No. 1,357,038 discloses a polymer composition comprising (a) a copolymer of styrene (for methylmethacrylate), a conjugated diene and an unsaturated ketone and (b) a thermoplastic synthetic resin other than the above-mentioned copolymer.

British Pat. No. 1,369,760 discloses an agricultural mulch comprising a polyolefin film having incorporated therein at least one additive selected from single- and multi-cation-exchanged sulfonated or wet air oxidized cokes.

British Pat. No. 1,372,830 discloses a plastic material comprising a photodegradable polyester containing ketone carbonyl groups.

British Pat. No. 1,373,707 discloses a polymer composition comprising a plastic material and one or more compounds represented by the formula:

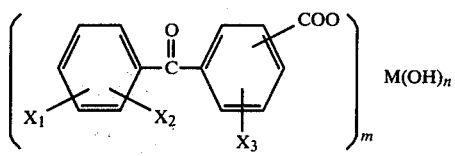

British Pat. No. 1,396,238 discloses a photodegradable composition comprising (a) a polymer of a monoethylenically unsaturated hydrocarbon monomer and (b) sulfur or a dialkyl polysulfide.

The resin compositions in the above-described patents all possess photodegradability, but they are different from those of this invention.

SUMMARY OF THE INVENTION

It is one object of this invention to provide a synthetic resin composition which is stable during use but which, when discarded and exposed to sunlight, degrades and decomposes.

Another object of this invention is to provide a photodegradable synthetic resin composition which has a low heat of combustion and which can be easily incinerated.

Further object of this invention is to provide a biodegradable synthetic resin composition which has a low heat of combustion and which can be easily incinerated.

The present invention is based on the discovery that polyolefin resin compositions containing certain organic substances exhibit photodegradability, and some of these resin compositions show biodegradability. Further, when an inorganic filler is added to such resin compositions, the compositions have improved degradability, and their heat of combustion is reduced, whereby molten resin is not spattered during combustion and the resins can be incinerated very easily. In particular, while conventional commercially available degradable resins do not exhibit satisfactory degradability or moldability and are therefore limited to films of a thickness of at most 0.2 mm, the degradable resin compositions of this invention are suitable for blow molding as well as film formation.

In more detail, the present invention provides a degradable synthetic resin composition comprising (A) a homopolymer of ethylene or propylene, a copolymer of ethylene and propylene, a mixture of polyethylene and polypropylene or mixtures of all such materials; (B) about 0.2 to about 10% by weight, based on the total weight of the composition, of at least one degradation promotor selected from the group consisting of higher fatty acids and the esters thereof; and, optionally, (C) about 10 to about 60% by weight, based on the total weight of the composition, of at least one inorganic filler which reduces the heat of combustion of the composition selected from the group consisting of calcium carbonate, calcium sulfate, calcium phosphate, magnesium silicate, magnesium carbonate and mixtures thereof.

BRIEF DESCRIPTION OF THE ACCOMPANYING DRAWINGS

DETAILED DESCRIPTION OF THE INVENTION

Figure 1:
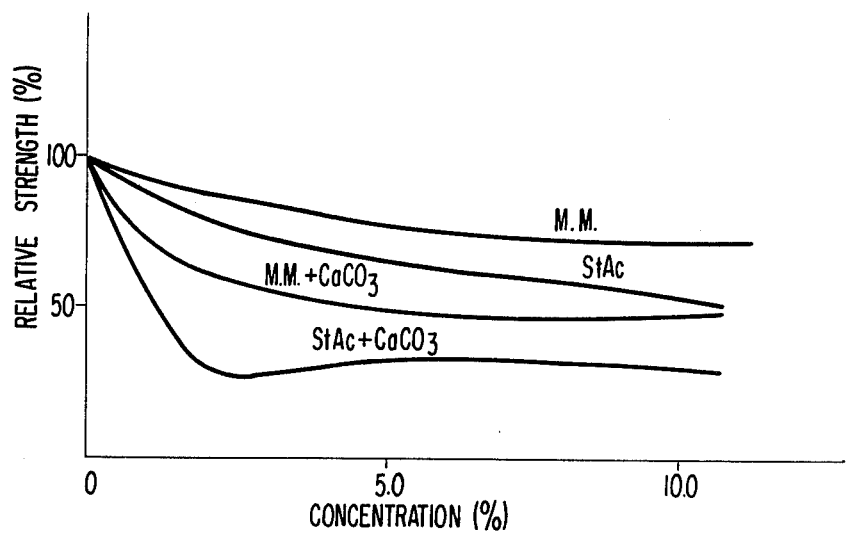
FIG. 1 shows the relationship between the relative strength and concentration of degradation promotor.

In the following discussion, the term "polyolefin" means a homopolymer of ethylene or propylene, a copolymer of ethylene and propylene, a mixture of polyethylene and polypropylene, or mixtures thereof.

The term "resin component" refers to a blend of resins which comprises at least about 50% by weight of such a polyolefin(s) and not more than about 50% by weight of another resin.

The term "resin composition" refers to a composition comprising such a resin component and at least one degradation promotor, optionally with an inorganic filler and further optionally with benzophenone or a derivative thereof.

All percentages are weight percentages based on the weight of the resin compositions, unless otherwise indicated.

The resin used in this invention comprises a homopolymer of ethylene or propylene, a copolymer of ethylene and propylene, a mixture of polyethylene and polypropylene, or a mixture thereof where the ethylene and propylene or polyethylene and polypropylene can be present in any proportion (hereafter such resins are termed "polyolefins"). Representative ethylene/propylene copolymers are described, for example, in Japanese Patent Publications Nos. 15284/61, 11436/62, 14834/63, 21494/63, 1836/64, 1930/65, 15535/64 and 820/65.

Resin materials which comprises at least about 50% of such polyolefins and not more than about 50% of another resin can also be used as the resin. Such other resins are generally used to improve the impact strength, vacuum sheet-formability, and resistance to stress cracking of the polyolefins. Examples of such other resins are synthetic rubbers such as a butadiene rubber, styrene/butadiene rubber, butadiene/acrylonitrile rubber, ethylene/propylene rubber or polyisobutylene rubber, chlorinated polyolefins, and polyvinyl acetate.

The polyolefin of the resin component may be a commercial grade polyolefin, for example, HIZEX 5100B (polyethylene having a melt index, measured by ASTM-D 1238-65T, of 0.25 dg/min, trademark for a product of Mitsui Petrochemical Industry Ltd.), CHISSO POLYPRO 1016 (polypropylene having a melt index, measured by ASTM-D 1238-65T, of 5.0 dg/min, trademark for a product of Chisso Corporation) and the like.

Polypropylene has a high degradation speed, and by blending polypropylene and polyethylene or copolymerizing propylene with ethylene, the resulting polyolefin has a degradation speed intermediate that of polypropylene and polyethylene.

Any commercially available ethylene or propylene material can be used in this invention, with preferred ethylene materials having a density of 0.94 to 0.97 g/cc (ASTM-D 1505-67) and a melt index of 0.1 to 14.0, preferably 0.1 to 6.0, dg/min (ASTM-D 1238-65T), and preferred propylene materials having a density of 0.90 to 0.92 g/cc and a melt index of 0.5 to 25.0, preferably 0.5 to 6.0, dg/min.

The organic degradation promotor used in this invention is selected from the group consisting of higher fatty acids, esters thereof and mixtures thereof. The term "higher fatty acid" as used herein denotes a carboxylic acid (preferably a monocarboxylic acid) containing 10 to 18 carbon atoms and which is free of a branched chain such as an ethyl or higher alkyl group, i.e., they are essentially straight chain materials except for a side methylene group or groups. Specific examples are capric acid, lauric acid, myristic acid, palmitic acid, margaric acid, stearic acid, lauroleic acid, oleic acid and iso-acids thereof.

The term "higher fatty acid esters" as used herein denotes esters formed between the above higher fatty acids and aliphatic alcohols containing not more than 18 carbon atoms and which are also free of a branched chain such as an ethyl or higher alkyl group, i.e., they are essentially straight chain materials except for a side methylene group or groups. Esters formed between the fatty acids and monohydric aliphatic alcohols containing 10 to 18 carbon atoms are especially preferred as degradation promotors in accordance with this invention.

Fatty acids containing 16 to 18 carbon atoms and the esters thereof are preferred. Palmitic acid, stearic acid, myristyl myristate, myristyl palmitate, and myristyl stearate are most preferred.

Examples of aliphatic alcohols used to form such higher fatty acid esters are hexadecane-1,2-diol, octadecane-1,2-diol and saturated monohydric alcohols ranging from methanol to octadecanol, nonanol, undecanol, 14-methylhexadecanol, oleyl alcohol, and linoleyl alcohol.

Straight-chain saturated fatty acids containing 10 to 18 carbon atoms are most preferred in view of their degrading effects. However, since fatty acids may possibly interact with substances contained in a bottle prepared from the composition of this invention by blow molding, it is desirable to use esters formed between straight-chain saturated monohydric fatty acids containing 10 to 18 carbon atoms and straight-chain saturated monohydric alcohols containing 10 to 18 carbon atoms.

The acids or esters used in the present invention can be saturated or unsaturated, but do not include a cyclic ring structure.

The amount of the organic degradation promotor is preferably about 0.2 to 10% by weight of the resin composition. When the amount is less than about 0.2% by weight, scarcely any degrading effect is obtained, while when it is larger than about 10% by weight, blooming sometimes occurs, and the moldability of the composition becomes poorer, resulting in slipping of the injection screw in an injection molding, for example.

The inorganic filler optionally used in this invention is selected from the group consisting of calcium carbonate, calcium sulfate, calcium phosphate, magnesium silicate, magnesium carbonate and mixtures thereof, with calcium carbonate being especially preferred. The average particle diameter of the inorganic filler is preferably about 1.0 to about 2.5 microns. The inorganic filler has the effect of reducing the composition's heat of combustion. It also promotes the photodegradation of the composition, renders it susceptible to attack by microorganisms, and inhibits blooming of the organic degeneration promotor onto the surface of the resin composition.

The amount of the inorganic filler is preferably about 10 to 60% by weight of the resin composition. When it is less than about 10% by weight, various effects such as promotion of the degrading effect and the reduction of the heat of combustion cannot be fully attained, while when it is larger than about 60% by weight, the moldability of the composition becomes poor and molded articles result which have a rough surface, a poor appearance and reduced physical strength (initial strength).

When 0.5 to 4.0% by weight of the organic degradation promotor and 30 to 50% by weight of the inorganic filler are used in combination, there is obtained a synthetic resin composition having excellent moldability which provides molded articles with a satisfactory appearance, initial strength, photodegradability and a low heat of combustion, though photodegradability differs somewhat depending upon the form of the molded articles (e.g., film, sheet or thick article).

We have found that when benzophenone or a derivative thereof is incorporated in the resin composition of this invention as a degradation assistant, photodegradability strikingly increases. Examples of benzophenone derivatives are 2-hydroxybenzophenone, 2,4-dihydroxybenzophenone, 2,2', 4-trihydroxybenzophenone, 2,2'-dihydroxy-4-methoxybenzophenone, 2,2'-dihydroxy-4,4'-dimethoxybenzophenone and 2-hydroxy-4-methoxybenzophenone. The amount of the benzophenone or derivative thereof is not particularly restricted, but balancing its degradation promoting effect and coloration of the resin composition, the preferred amount is about 0.05 to 2.0% by weight.

The resin compositions of this invention can be used to form any products which have heretofore been made from polyolefin resins, for example, films, sheet-like buffer materials (shock absorbing materials), or blow-molded bottles for cosmetics. In view of their degrading effect, they are especially suitable for the preparation of agricultural films as is disclosed in U.S. Pat. Nos. 3,454,510 and 3,590,528. When such films are used in agricultural environment, for example, for seeding or seedling beds, they retain their shape for a certain required period, but after this period, they degrade into a scaly form and finally into a powdery form. Thus, the effort of discarding the used films can be avoided. By incorporating fertilizer components, for example, potassium chloride, superphosphate, ammonium nitrate or urea, in the films themselves, it becomes unnecessary to separately apply a fertilizer, and the fertilizer components help to render the films biodegradable. The fertilizer component can be incorporated in the resin composition of this invention in an amount of less than about 20%, preferably less than 10%, based on the weight of the resin composition.

For example, a film having a thickness of 0.05 mm prepared from a composition consisting of high density polyethylene (high density polyethylene generally means a polyethylene having a density of 0.94 to 0.99 g/cc) and 2.5% by weight of stearic acid disintegrates into small fragments in two weeks under direct sunlight in mid-summer. A 0.7 mm thick sheet prepared from a composition consisting of high density polyethylene, 2.5% by weight of stearic acid and 40% by weight of calcium carbonate becomes brittle in about 20 days under the same conditions. Sheets prepared from compositions comprising polypropylene and these additives would degrade even faster.

Degradation can be evaluated after exposure of samples to a carbon arc fade meter or to sunlight. In the case of a film or sheet, the tensile strength and elongation are measured; in the case of a panel, its flexural strength is measured; and in the case of molded articles such as blow-molded bottles, the compression strength is measured. These properties can be used to evaluate the degradation of the respective articles.

The following examples are given to illustrate the present invention in greater detail without limiting the same.

In all examples, the measurement conditions for strength and elongation were: temperature: 25° C.; humidity: 70%.

EXAMPLE 1

Commercially available high density polyethylene having a melt index (ASTM-D 1238-65T) of 0.25 dg/min and a density (ASTM-D 1505-67) of 0.947 g/cc was blended with a degradation promotor and an inorganic filler (calcium carbonate having an average particle size of 1.5 $\mu$) in an amount as shown in Table 1, and thoroughly kneaded at 230° to 300° C. The kneaded mixture was molded by press-forming into a plate having a thickness of 1.00 mm. A sample in the form according to JIS dumbbell No. 1 was prepared from the plate. The sample was exposed to a carbon arc fade meter (Type FA-2; product of Suga Test Instruments Co., Ltd.) for 120 hours on one surface and for another 120 hours on the other surface. The testing conditions employed were according to JIS-L-0824. In the subsequent examples described hereinafter, the testing conditions were identical. The tensile strength of the sample was then measured using a tensile tester (TENSILON UTM-4, Toyo Measuring Instrument Co., Ltd.). The results are shown in FIG. 1 which illustrates the relationship between the amount of degradation promotor and the reduction in the tensile strength of the sample. The tensile strength values are expressed as relative values in comparison to an unexposed sample. It can be seen from FIG. 1 that samples containing stearic acid or myristyl myristate tend to degrade, while a sample containing both stearic acid and calcium carbonate exhibits an especially marked degrading effect.

TABLE 1

| Run No. | Degradation Promotor (%) | Calcium Carbonate (%) | Polyethylene (%) |
|---|---|---|---|
| 1 | — | — | 100 |
| 2 | — | 40 | 60 |
| 3 | StAc (2.5) | — | balance |

TABLE 1-continued

| Run No. | Degradation Promotor (%) | Calcium Carbonate (%) | Polyethylene (%) |
|---|---|---|---|
| 4 | StAc (5.0) | — | balance |
| 5 | StAc (10.0) | — | balance |
| 6 | M.M. (2.5) | — | balance |
| 7 | M.M. (5.0) | — | balance |
| 8 | M.M. (10.0) | — | balance |
| 9 | StAc (2.5) | 40 | balance |
| 10 | StAc (5.0) | 40 | balance |
| 11 | StAc (10.0) | 40 | balance |
| 12 | M.M. (2.5) | 40 | balance |
| 13 | M.M. (5.0) | 40 | balance |
| 14 | M.M. (10.0) | 40 | balance |

StAc: stearic acid
M.M.: myristyl myristate

EXAMPLE 2

Figure 2:
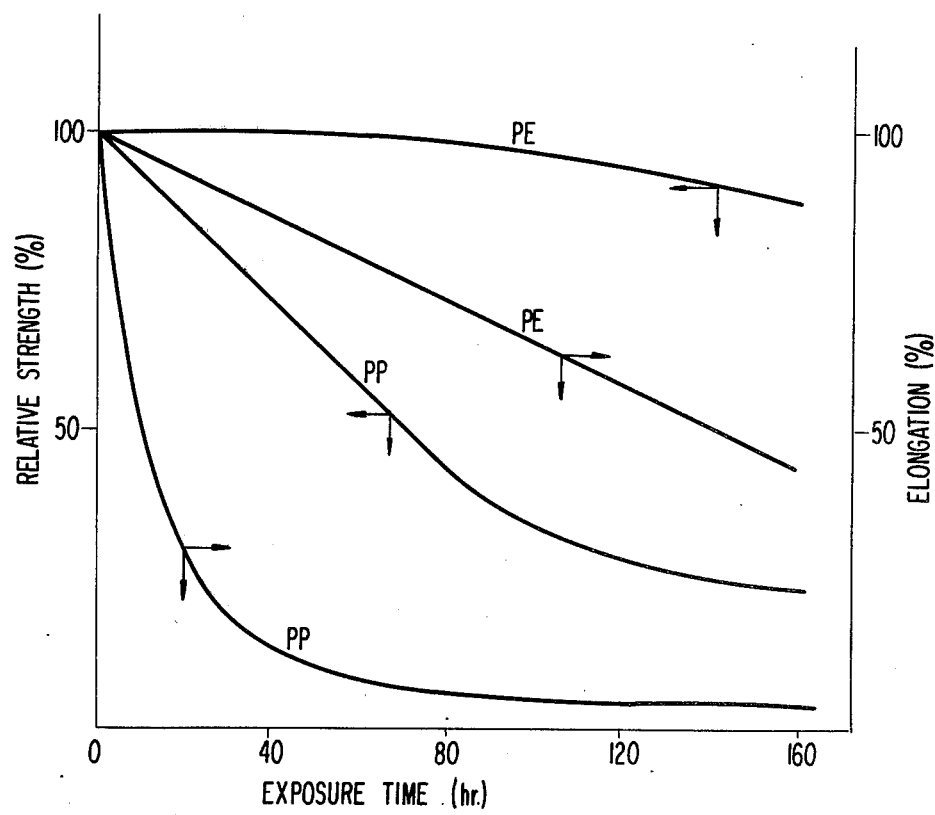
FIG. 2 shows the relationship between the relative strength, elongation and exposure time.

Each of a commercially available high density polyethylene the same as was used in Example 1 and polypropylene having a melt index (ASTM-D 1238-65T) of 5.0 dg/min was mixed with 0.8% by weight of stearic acid and 40% by weight of calcium carbonate, the amounts being based on the total weight of the resulting resin composition. The mixtures were formed into a sheet having a thickness of 0.7 mm which was then formed into samples according to JIS dumbbell No. 1. The samples were exposed to a carbon arc fade meter, and their tensile strength measured using a tensile tester (TENSILON UTM-4). The relationship between exposure time and tensile strength and elongation was measured, and the results are shown in FIG. 2.

In both cases, the samples tended to become brittle. In the case of the polypropylene-based sample, the degradation speed was high.

EXAMPLE 3

Figure 3:
FIG. 3 shows photographs of a bottle containing stearic acid (left) and a comparison bottle (right) after exposure.
Figure 4:
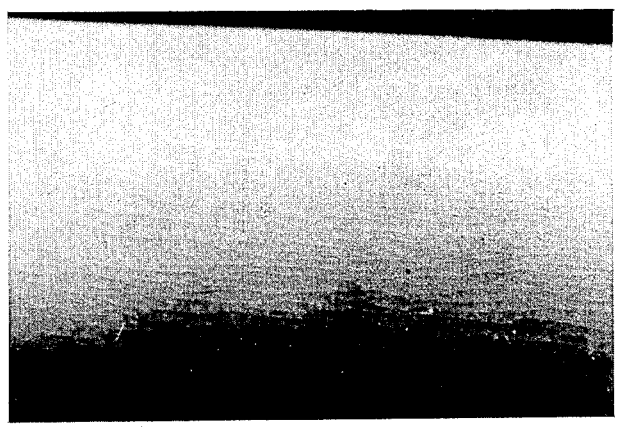
FIG. 4 is a photograph on an enlarged scale of the surface of the bottle containing stearic acid.
Figure 5:
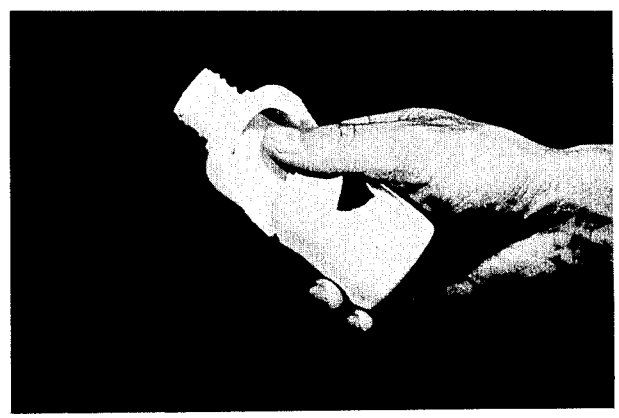
FIG. 5 shows the state of the bottle containing stearic acid being crushed by hand.
Figure 6:
FIG. 6 shows the sample containing the stearic acid broken.

Commercially available polyethylene as was used in Example 1 was mixed with 1.0% by weight of stearic acid based on the weight of the resin composition at 200° to 250° C. The mixture was blow-molded into a 4-ounce bottle of the Boston round type, whereafter the bottle was exposed to summer sunlight for 6 months. For comparison, a bottle made by blow molding polyethylene alone was exposed to sunlight under the same conditions. It was found that cracks occurred on the surface of the bottle made of the composition containing stearic acid and it could easily be broken by hand. The comparison bottle did not change in appearance and strength after exposure. The experimental results are shown in FIGS. 3 to 6. FIG. 3 shows photographs of the bottle containing stearic acid (left) and the comparison bottle (right) after exposure. FIG. 4 is a photograph on an enlarged scale of the surface of the bottle containing stearic acid. FIG. 5 shows the state of the bottle containing stearic acid being crushed by hand. FIG. 6 shows the sample containing the stearic acid broken.

EXAMPLE 4

Figure 7:
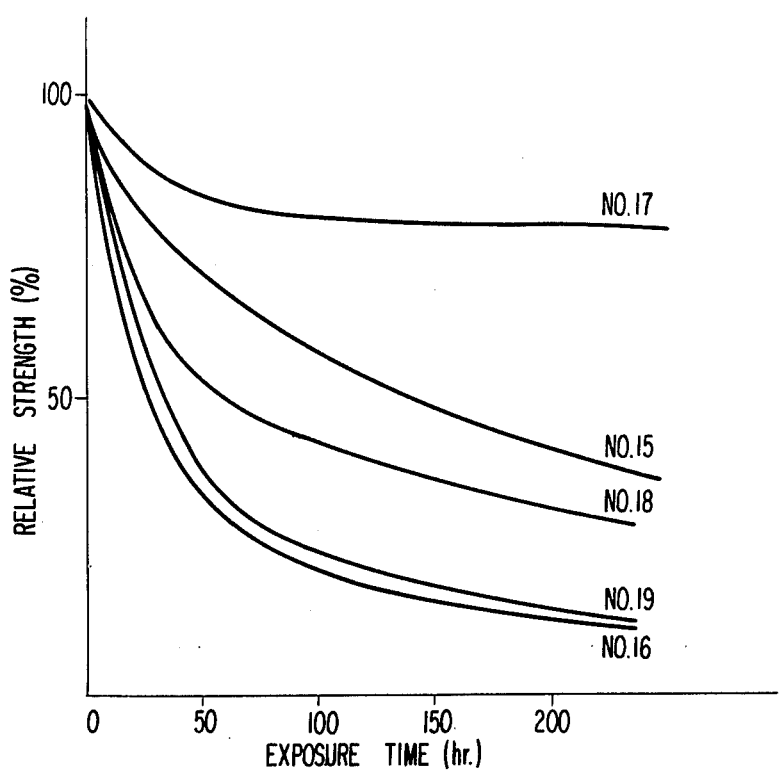
FIG. 7 shows the relationship between relative strength and exposure time.

In order to ascertain the effects of adding benzophenone, each of the polyolefins and the additives shown in Table 2 were kneaded at 230° to 300° C., and thereafter each of the mixtures obtained molded into a plate of a thickness of 2.00 mm by press-forming at 220° C. Each sample was exposed to the carbon arc fade meter for 200 hours and measurements were taken at 50, 100, 150 and 200 hours, whereafter the flexural strength of each sample was measured by a Universal testing machine (RS-2, a product of Shimadzu Seisakusho Co., Ltd.). The results are shown in FIG. 7 which shows the relationship between relative strength (%) and exposure time.

TABLE 2

| Run No. | Degradation Promotor (%) | Benzophenone (%) | Calcium Carbonate (%) | Resin |
|---|---|---|---|---|
| 15 | StAc (5.0) | 0.2 | — | polyethylene (balance) |
| 16 | StAc (5.0) | 0.2 | 40 | polyethylene (balance) |
| 17 | M.M. (5.0) | — | — | polypropylene (balance) |
| 18 | M.M. (5.0) | 0.2 | — | polypropylene (balance) |
| 19 | M.M. (5.0) | 0.2 | 40 | polypropylene (balance) |

*StAc and M.M. have the same meaning as in the footnote to Table 1.

EXAMPLE 5

Figure 8:
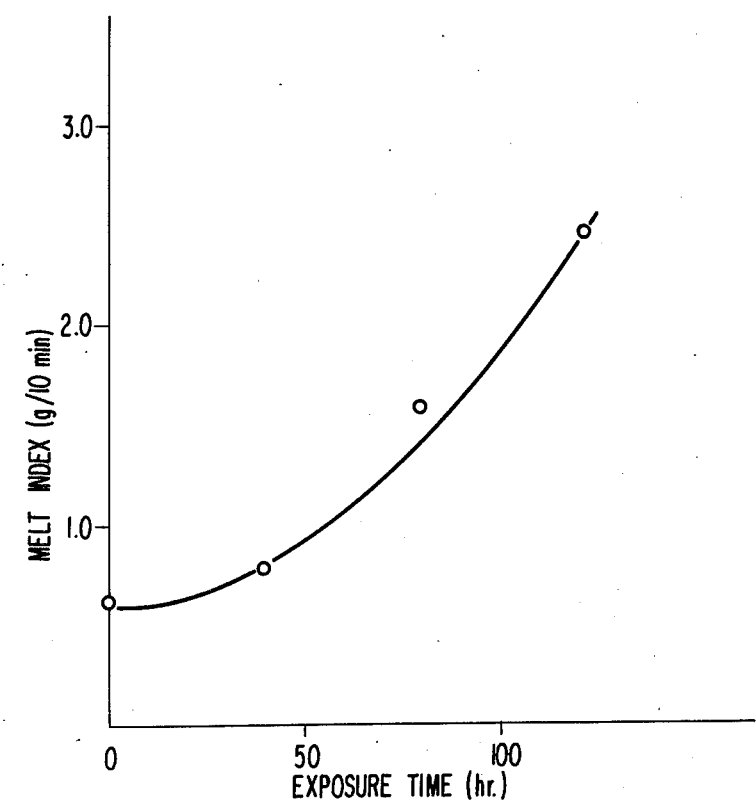
FIG. 8 shows the relationship between melt index and exposure time.

A composition consisting of a commercially available high density polyethylene having a melt index of 0.30 dg/min and a specific gravity of 0.957, 40% by weight of calcium carbonate having an average particle size of 2.2μ and 2.5% by weight of stearic acid (mixed at 230° to 300° C.) was exposed to a carbon arc fade meter, and the relationship between exposure time and melt index (according to ASTM-D 1238-65T) of the sample determined. The results are shown in FIG. 8. It can be seen that the melt index of the sample increased with exposure time. This suggests that the polymer chain of polyolefin in the composition was cleaved.

While the invention has been described in detail and with reference to specific embodiments thereof, it will be apparent to one skilled in the art that various changes and modifications can be made therein without departing from the spirit and scope thereof.

What is claimed is:

1. A degradable synthetic resin composition consisting essentially of (A) a resin base consisting of a homopolymer of ethylene or propylene, a copolymer of ethylene and propylene, a mixture of polyethylene and polypropylene or a mixture of such materials, (B) about 0.2 to about 10% by weight, based on the total weight of the composition, of at least one degradation promotor selected from the group consisting of esters of fatty acids having 10-18 carbon atoms with monohydric aliphatic alcohols having 10-18 carbon atoms, and (C) about 10 to about 60% by weight, based on the total weight of the composition, of at least one inorganic filler selected from the group consisting of calcium carbonate, calcium sulfate, calcium phosphate, magnesium carbonate and magnesium silicate.

2. The composition of claim 1, wherein said degradation promotor is myristyl myristate in an amount of 0.5 to 4.0% by weight, and said inorganic filler is calcium carbonate in an amount of 30 to 50% by weight.

* * * * *